(12) United States Patent
Behzad et al.

(10) Patent No.: US 8,175,544 B2
(45) Date of Patent: *May 8, 2012

(54) SYSTEM AND METHOD PROVIDING VARIABLE-FREQUENCY IF CONVERSION IN A MULTIMODE COMMUNICATION DEVICE

(75) Inventors: Arya Behzad, Poway, CA (US); Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/052,572

(22) Filed: Mar. 21, 2011

(65) Prior Publication Data

US 2011/0171917 A1 Jul. 14, 2011

Related U.S. Application Data

(63) Continuation of application No. 11/376,531, filed on Mar. 15, 2006, now Pat. No. 7,912,428.

(60) Provisional application No. 60/737,258, filed on Nov. 16, 2005.

(51) Int. Cl.
*H04B 1/40* (2006.01)
*H04K 3/00* (2006.01)

(52) U.S. Cl. ........ 455/76; 455/260; 455/552.1; 370/336

(58) Field of Classification Search .................... 455/76, 455/85–86, 260, 552.1, 553.1; 370/336–337, 370/347
See application file for complete search history.

(56) References Cited

U.S. PATENT DOCUMENTS

| | | | |
|---|---|---|---|
| 3,743,941 A | 7/1973 | Gans et al. |
| 5,640,694 A | 6/1997 | Milton, Jr. |
| 5,953,641 A | 9/1999 | Auvray |
| 6,097,974 A | 8/2000 | Camp et al. |
| 6,256,511 B1 | 7/2001 | Brown et al. |

(Continued)

FOREIGN PATENT DOCUMENTS

WO WO 9931812 6/1999

(Continued)

OTHER PUBLICATIONS

Communication and European Search Report corresponding to EP Application No. 06016875, 4 pages, mailed Mar. 21, 2007.

(Continued)

*Primary Examiner* — Lee Nguyen
(74) *Attorney, Agent, or Firm* — Thomas, Kayden, Horstmeyer & Risley, LLP

(57) ABSTRACT

A system and method providing variable-frequency IF conversion in a multimode communication device. Various aspects of the present invention provide a multimode communication device comprising at least one RF signal receiver adapted to receive at least a first RF signal corresponding to a first communication protocol and a second RF signal corresponding to a second communication protocol. A controllable frequency source may, for example, be adapted to output a mixing signal characterized by one of a plurality of selectable frequencies. Such selectable frequencies may, for example, comprise a first frequency corresponding to the first communication protocol and a second frequency corresponding to the second communication protocol. A mixer may, for example, receive a received RF signal from the RF signal receiver, receive a mixing signal from the controllable frequency source, and convert the received RF signal to an IF signal utilizing the received mixing signal.

20 Claims, 4 Drawing Sheets

U.S. PATENT DOCUMENTS

| | | |
|---|---|---|
| 6,389,059 B1 | 5/2002 | Smith et al. |
| 6,901,243 B2 | 5/2005 | Jayaraman et al. |
| 6,917,328 B2 | 7/2005 | Rabinowitz et al. |
| 7,106,816 B2 | 9/2006 | Filipovic |
| 7,269,424 B2 | 9/2007 | Camp, Jr. |
| 7,526,052 B2 | 4/2009 | Davidoff et al. |
| 7,590,396 B2 | 9/2009 | Behzad et al. |
| 7,676,211 B2 | 3/2010 | Martin et al. |
| 7,912,428 B2 | 3/2011 | Behzad et al. |
| 2001/0016476 A1 | 8/2001 | Kasahara et al. |
| 2002/0003844 A1 | 1/2002 | Doetsch et al. |
| 2003/0087622 A1 | 5/2003 | Jayaraman et al. |
| 2003/0153322 A1 | 8/2003 | Burke et al. |
| 2004/0120421 A1 | 6/2004 | Filipovic |
| 2004/0162023 A1 | 8/2004 | Cho |
| 2005/0020298 A1 | 1/2005 | Masumoto et al. |
| 2005/0032480 A1 | 2/2005 | Lee et al. |
| 2005/0119025 A1 | 6/2005 | Mohindra et al. |
| 2005/0124377 A1 | 6/2005 | Shih et al. |
| 2006/0063493 A1 | 3/2006 | Yanduru et al. |
| 2006/0178165 A1 | 8/2006 | Vassiliou et al. |
| 2006/0205376 A1 | 9/2006 | Brobston et al. |
| 2006/0227887 A1 | 10/2006 | Li et al. |
| 2007/0082646 A1 | 4/2007 | Behzad et al. |
| 2007/0110019 A1 | 5/2007 | Behzad et al. |
| 2007/0211786 A1 | 9/2007 | Shattil |
| 2010/0003936 A1 | 1/2010 | Behzad et al. |

FOREIGN PATENT DOCUMENTS

| | | |
|---|---|---|
| WO | WO 9934625 | 7/1999 |
| WO | WO 02/27953 | 4/2002 |
| WO | WO 2004/036777 | 4/2004 |

OTHER PUBLICATIONS

Communication with European Search Report corresponding to European Patent Application Serial No. EP 06014344.3, 7 pages, Feb. 15, 2011.

Manku, T. et al., "A Single Chip Direct Conversion CMOS Transceiver for Quad-Band GSM/GPRS/EDGE and WLAN with integrated VCO's and fractional-N Synthesizer"; Radio Frequency Integrated Circuits (RFIC) Symposium, 2004. Digest of Papers, Jun. 6, 2004-Jun. 8, 2004; pp. 423-426; XP010713596 ieee; Piscataway, NJ, USA.

SYSTEM AND METHOD PROVIDING VARIABLE-FREQUENCY IF CONVERSION IN A MULTIMODE COMMUNICATION DEVICE

CROSS-REFERENCE TO RELATED APPLICATIONS/INCORPORATION BY REFERENCE

This patent application is a continuation of U.S. patent application Ser. No. 11/376,531, filed Mar. 15, 2006, and issuing on Mar. 22, 2011 as U.S. Pat. No. 7,912,428; which makes reference to, claims priority to and claims benefit from U.S. provisional patent application Ser. No. 60/737,258 filed Nov. 16, 2005, entitled "SYSTEM AND METHOD PROVIDING VARIABLE-FREQUENCY IF CONVERSION IN A MULTIMODE COMMUNICATION DEVICE," the contents of each of which are hereby incorporated herein by reference in their entirety. Also, U.S. patent application Ser. No. 11/298,371, filed Dec. 7, 2005, entitled "MULTIMODE COMMUNICATION DEVICE WITH SHARED SIGNAL PATH PROGRAMMABLE FILTER," is hereby incorporated herein in its entirety by reference.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Mobile communication devices are continually increasing in popularity. Such mobile communication devices include, for example and without limitation, cellular phones, paging devices, portable email devices, and personal digital assistants. Mobile communication devices provide the user with the capability to conduct communications while moving through a variety of environments.

Mobile communication devices may operate in accordance with multiple communication modes. For example a mobile communication device may be adapted to operate in a cellular communication mode and a wireless computer network communication mode. Such multimode mobile communication devices may utilize respective radio configurations for each communication mode. For example, various communication modes may correspond to different respective radios.

As the number of radios in a multimode communication device increases, communication circuitry (e.g., mixers, frequency synthesizers, filters, etc.) may become increasingly numerous, complex and/or costly. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method providing variable-frequency IF conversion in a multimode communication device, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
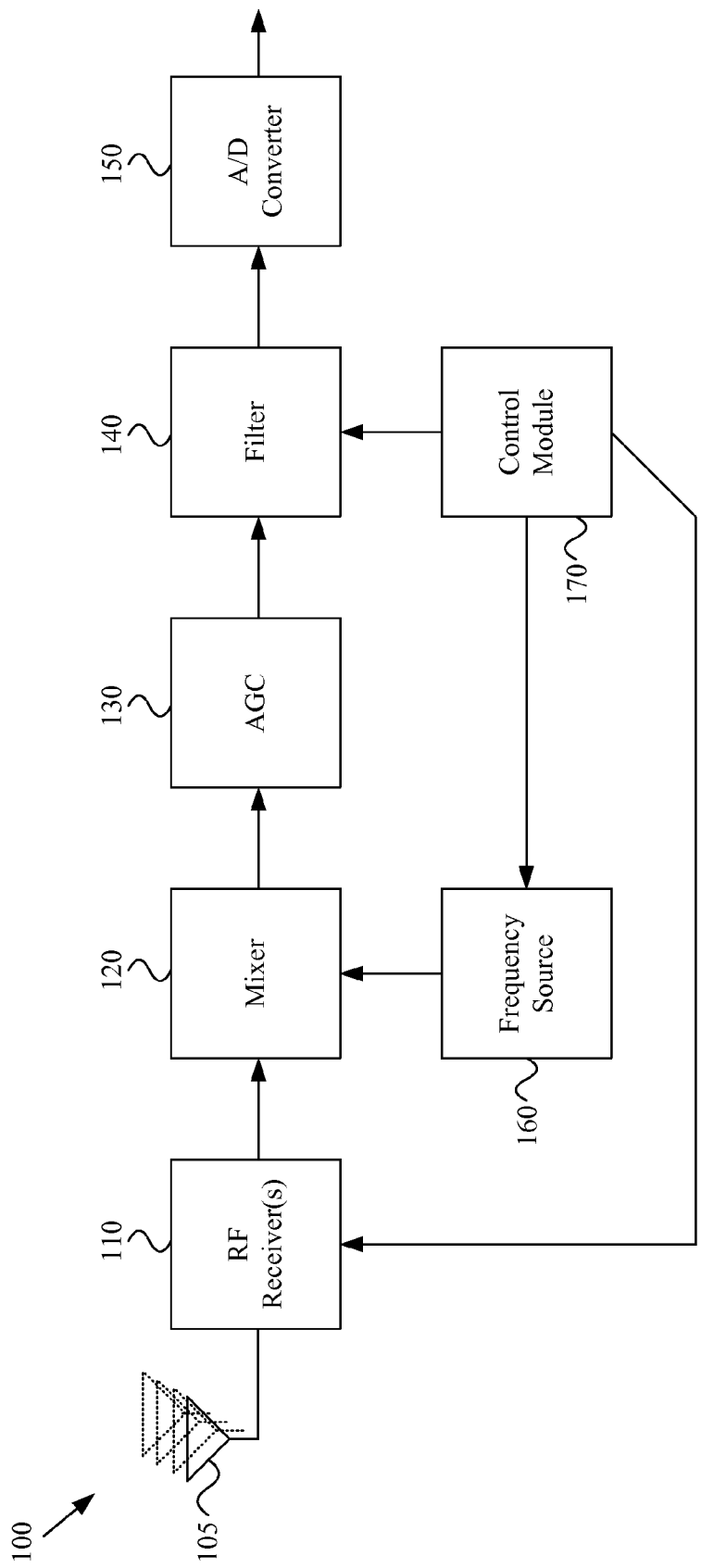
FIG. 1 is a diagram illustrating a portion of an exemplary multimode communication system, in accordance with various aspects of the present invention.

FIG. 1 is a diagram illustrating a portion of an exemplary multimode communication system 100, in accordance with various aspects of the present invention. The multimode communication system 100 may comprise characteristics of any of a variety of communication systems. For example and without limitation, the multimode communication system may comprise characteristics of any of a variety of mobile communication devices (e.g., cellular phones, paging devices, portable email devices, personal digital assistance, etc.). Also for example, the communication system 100 may comprise characteristics of fixed communication systems or devices (e.g., network access points, base stations, satellites, wireless routers, set top boxes, etc.). Further for example, the communication system 100 may comprise characteristics of a variety of electronic devices with wireless communication capability (e.g., televisions, music players, cameras, remote controls, etc.) Accordingly, the scope of various aspects of the present invention should not be limited by characteristics of particular communication systems or devices.

The following discussion will refer to various communication modes. For the following discussion, a communication mode may generally be considered to coincide with communication utilizing a particular communication protocol or standard. A non-limiting list of exemplary communication protocols includes various cellular communication protocols (e.g., GSM, GRPS, EDGE, CDMA, WCDMA, TDMA, PDC, etc.), various wireless networking protocols or standards, including WLAN, WMAN, WPAN and WWAN (e.g., IEEE 802.11, Bluetooth, IEEE 802.15, UWB, IEEE 802.16, IEEE 802.20, any WiFi protocol, etc.), various television communication standards, etc. Accordingly, the scope of various aspects of the present invention should not be limited by characteristics of particular communication protocols, either standard or proprietary.

The exemplary communication system 100 may comprise an RF antenna 105. As illustrated in FIG. 1, the system 100 may, in various exemplary configurations, comprise a plurality of RF antennas (e.g., in a MIMO configuration, MISO configuration, beam-forming configuration, configuration where particular communication modes utilize particular antennas, etc.). Though the following discussion will generally discuss RF signals received through one antenna and processed through one signal-processing pathway, it should be understood that various aspects of the present invention are readily extensible to system configurations utilizing a plurality of antennas and/or signal processing pathways.

The exemplary system 100 comprises at least one RF signal receiver 110 adapted to receive RF signals corresponding to a plurality of communication protocols. In a non-limiting exemplary scenario, the RF signal receiver 110 may be adapted to receive a first RF signal corresponding to a first communication protocol and a second RF signal corresponding to a second communication protocol.

The RF signal receiver 110 may comprise characteristics of any of a variety of RF receiving circuitry. Such circuitry may, for example, comprise filter circuitry, low-noise amplifier ("LNA") circuitry, noise cancellation circuitry, etc.

The exemplary system 100 may comprise a mixer 120. The mixer 120 may, for example, be adapted to convert a received RF signal to an IF signal through mixing a received RF signal with a mixing signal having a particular intermediate mixing frequency. The mixer 120 may also, for example, be adapted to convert a received RF signal to a signal at baseband frequency through mixing a received RF signal with a mixing signal having the frequency of the received RF signal.

In a non-limiting exemplary scenario, the mixer 120 may be adapted to receive a first RF signal (e.g., from the RF receiver 110) and a first mixing signal characterized by a first intermediate frequency, mix the first RF signal and first mixing signal, and output a first IF signal characterized by a first intermediate frequency. Continuing, the mixer 120 may also be adapted to receive a second RF signal (e.g., from the RF receiver 110) and a second mixing signal characterized by a second intermediate frequency, mix the second RF signal and the second mixing signal, and output a second IF signal characterized by the second intermediate frequency. For example, the first and second RF/mixing signal pairs may be received serially. Continuing the non-limiting exemplary scenario, the mixer 120 may also be adapted to receive a third RF signal (e.g., from the RF receiver 110) and a third mixing signal characterized by a third mixing frequency (e.g., characterized by the frequency of the third RF signal), mix the third RF signal and the third mixing signal, and output a third signal characterized by a baseband frequency.

The system 100 may also comprise a frequency source 160 that is adapted to output a mixing signal (e.g., to the mixer 120). The frequency source 160 may, for example, be adapted to output a mixing signal characterized by one of a plurality of selectable frequencies (e.g., IF frequencies, RF frequencies and in various scenarios, a frequency of zero). For example, the frequency source 160 may be adapted to receive a frequency control signal, determine the frequency of the mixing signal based at least in part on the received frequency control signal, and output the mixing signal characterized by the determined frequency.

The frequency source 160 may comprise characteristics of any of a variety of frequency generating/synthesizing circuits. For example, the frequency source 160 may comprise characteristics of a local oscillator. Also for example, the frequency source 160 may comprise characteristics of a fractional-N synthesizer. The frequency source 160 may comprise characteristics of any of a variety of circuits adapted to output a signal at a controllable, programmable or otherwise selectable frequency.

In a non-limiting exemplary scenario, in response to a first frequency control signal, the frequency source 160 may be adapted to generate (or output) a mixing signal characterized by a first intermediate mixing frequency corresponding to a first communication protocol. Continuing, in response to a second frequency control signal, the frequency source 160 may be adapted to generate a mixing signal characterized by a second intermediate mixing frequency corresponding to a second communication protocol. Further, in response to a third frequency control signal, the frequency source 160 may be adapted to generate a mixing signal characterized by an RF frequency corresponding to a third communication protocol (e.g., for direct conversion from RF to baseband).

In another non-limiting exemplary scenario, in response to a first frequency control signal, the frequency source 160 may be adapted to generate (or output) a mixing signal characterized by a first intermediate frequency corresponding to the GSM communication protocol. Such an intermediate frequency may, for example, be approximately 100 KHz or, for example, less than or equal to 150 KHz. Then in response to a second frequency control signal, the frequency source 160 may be adapted to generate (or output) a mixing signal characterized by a second intermediate frequency corresponding to the EDGE communication protocol. Such an intermediate frequency may, for example, be approximately 300 KHz, 200 KHz or, for example, greater than or equal to 150 KHz. Then in response to a third frequency control signal, the frequency source 160 may be adapted to generate (or output) a mixing signal characterized by an RF frequency corresponding to the WCDMA protocol. Such a mixing signal may, for example, be utilized by a mixer (e.g., the mixer 120 or other mixer) for direct conversion of the WCDMA signal from RF to baseband.

The exemplary system 100 may also comprise a variety of amplifier and/or gain control circuitry. For example, the exemplary system 100 is illustrated with an AGC module 130 adapted to control the amplitude of a signal processed by the AGC module 130. The AGC module 130 may, for example, be adapted to maintain amplitude of a signal corresponding to any of a variety of communication protocols. Such a signal may, for example, be at an intermediate frequency or a baseband frequency.

The exemplary system 100 may also comprise any of a variety of additional signal handling/processing circuitry that is not illustrated in FIG. 1. Various circuitry, which may be typical in various communication scenarios, has been excluded from FIG. 1 for illustrative clarity.

The exemplary system 100 may further comprise a filter 140 (e.g., communicatively coupled to the mixer 120). The filter 140 may, for example, be adapted to filter a signal in accordance with a plurality of selectable sets of filter characteristics. Non-limiting characteristics of exemplary controllable filters are presented in U.S. patent application Ser. No. 11/,298,371, entitled "MULTIMODE COMMUNICATION DEVICE WITH SHARED SIGNAL PATH PROGRAMMABLE FILTER," which is hereby incorporated herein in its entirety by reference.

A set of filter characteristics may, for example, correspond to a particular communication mode (or protocol). For example and without limitation, a first set of filter characteristics may correspond to a first communication protocol and comprise a first filter bandwidth and/or first filter center frequency. A second set of filter characteristics may then, for example, correspond to a second communication protocol and comprise a second filter bandwidth and/or second filter center frequency. An $N^{th}$ set of filter characteristics may, for example, correspond to an $N^{th}$ communication protocol and comprise an $N^{th}$ filter bandwidth and/or $N^{th}$ filter center frequency.

In a non-limiting exemplary scenario, a first set of filter characteristics may correspond to the GSM protocol and comprise a relatively narrow filter bandwidth, and a second set of filter characteristics may correspond to the WCDMA protocol and comprise a relatively wide filter bandwidth.

Though the exemplary filter 140 illustrated in FIG. 1 is an analog filter, various aspects of the present invention are readily extensible to digital filters or analog/digital hybrid filters. Additionally, though only one filter with selectable filter characteristics is illustrated in FIG. 1, more than one of such filters may be utilized. As a non-limiting example, the first filter 140 may be as described above, and a second filter (e.g., a digital filter) may be communicatively coupled to the output of the A/D converter 150.

The exemplary system 100 may also include a control module 170 that is adapted to direct the frequency source 160 to generate the mixing signal at a particular frequency. For example, the control module 170 may communicate a frequency control signal to the frequency source 160. Such a control signal may be a continuous signal utilized to continuously control the frequency source 160, an intermittent signal, a triggering signal, or may be a programming signal that programs the frequency source 160 to generate a mixing signal at a particular frequency.

The control module 170 may also, for example, be adapted to direct a filter (e.g., the filter 140 and/or other filters) to filter a signal in accordance with a particular set of filter characteristics. The control module 170 may further, for example, be adapted to direct an RF receiver (e.g., the RF receiver 110) to receive a particular RF signal.

In a non-limiting exemplary scenario, the control module 170 (or other module communicatively coupled to the control module 170) may determine to receive a signal corresponding to a first communication protocol. The control module 170 may then, for example, direct any or all of the RF receiver 110, the frequency source 160 and the filter 140 to operate in accordance with the first communication protocol. For example, the control module 170 may communicate a control signal to the RF receiver 110 to receive an RF signal corresponding to the first communication protocol, communicate a control signal to the frequency source 160 to generate a mixing signal characterized by an intermediate frequency corresponding to the first communication protocol, and communicate a control signal to the filter 140 to filter a signal according to a first set of filter characteristics corresponding to the first communication protocol.

Continuing the non-limiting exemplary scenario, the control module 170 (or other module communicatively coupled to the control module 170) may determine to receive a signal corresponding to a second communication protocol. The control module 170 may then, for example, direct any or all of the RF receiver 110, the frequency source 160 and the filter 140 to operate in accordance with the second communication protocol. For example, the control module 170 may communicate a control signal to the RF receiver 110 to receive an RF signal corresponding to the second communication protocol, communicate a control signal to the frequency source 160 to generate a mixing signal characterized by an intermediate frequency corresponding to the second communication protocol, and communicate a control signal to the filter 140 to filter a signal according to a second set of filter characteristics corresponding to the second communication protocol.

In another non-limiting exemplary scenario, the exemplary communication system 100 may receive time-multiplexed information corresponding to a plurality of communication protocols. For example, the RF signal receiver 110 may be adapted to receive a first RF signal and a second RF signal in a time-multiplexed manner. In such a scenario, during time windows corresponding to the first communication protocol, the control module 170 may be adapted to direct the RF signal receiver 110 to receive the first RF signal, direct the frequency source 160 to output a mixing signal at a first mixing frequency corresponding to the first communication protocol, and direct the filter 140 to filter in accordance with a first set of filter characteristics corresponding to the first communication protocol. During time windows corresponding to the second communication protocol, the control module 170 may be adapted to direct the RF signal receiver 110 to receive the second RF signal, direct the frequency source 160 to output a mixing signal at a second mixing frequency corresponding to the second communication protocol, and direct the filter 140 to filter in accordance with a second set of filter characteristics corresponding to the second communication protocol.

The exemplary system 100 was presented to provide non-limiting illustrations of a portion of various aspects of the present invention. Accordingly, the scope of various aspects of the present invention should not be limited by particular characteristics of the exemplary system 100.

Figure 2:
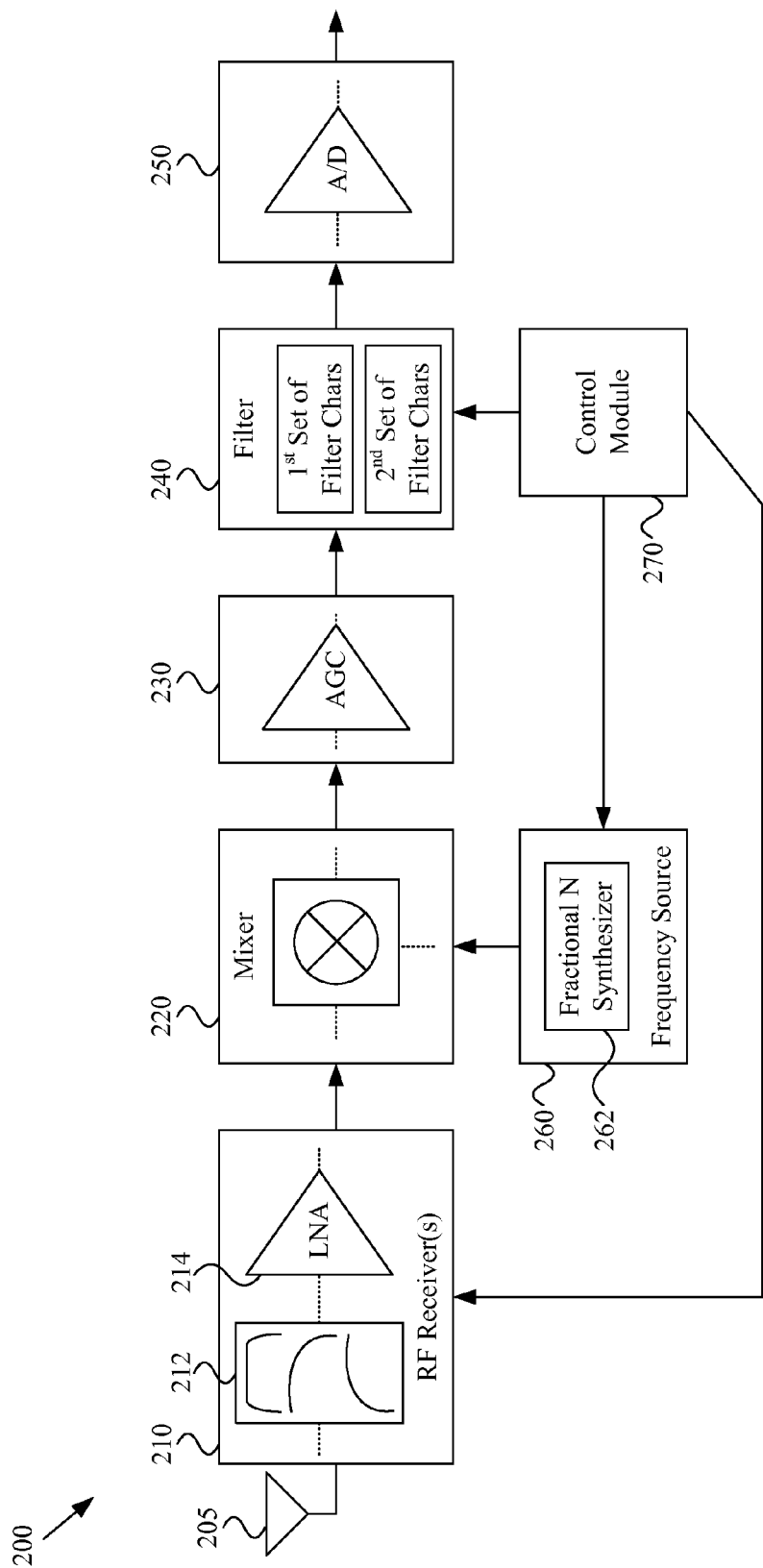
FIG. 2 is a diagram illustrating a portion of an exemplary multimode communication system, in accordance with various aspects of the present invention.

FIG. 2 is a diagram illustrating a portion of an exemplary multimode communication system 200, in accordance with various aspects of the present invention. The exemplary system 200 may, for example and without limitation, share any or all characteristics with the exemplary system 100 illustrated in FIG. 1 and discussed previously.

The exemplary communication system 200 may comprise an RF antenna 205. The exemplary system 200 may also comprise at least one RF signal receiver 210 adapted to receive RF signals corresponding to a plurality of communication protocols. The RF antenna 205 and RF signal receiver 210 may, for example and without limitation, share any or all characteristics with the antenna 105 and RF signal receiver(s) 110 of the system 100 illustrated in FIG. 1 and discussed previously. The RF signal receiver 210 may, for example, comprise an RF filter 212 (e.g., band-pass, low-pass and/or high-pass) and a low-noise amplifier 214, among other circuitry.

In a non-limiting exemplary scenario, the RF signal receiver 210 may be adapted to receive a first RF signal corresponding to a first communication protocol and a second RF signal corresponding to a second communication protocol.

The exemplary system 200 also comprises a mixer 220 and a frequency source 260 that may, for example and without limitation, share any or all characteristics with the mixer 120 and frequency source 160 of the exemplary system 100 illustrated in FIG. 1 and discussed previously.

The frequency source 260 may, for example, be adapted to output a mixing signal characterized by one of a plurality of selectable frequencies (e.g., IF and/or RF frequencies). For example, the frequency source 260 may be adapted to receive a frequency control signal, determine the frequency of a mixing signal based at least in part on the received frequency control signal, and output the mixing signal characterized by the determined frequency.

Though the frequency source 260 is illustrated including a fractional-N synthesizer 262, the frequency source 260 may comprise characteristics of any of a variety of frequency generating/synthesizing circuits (e.g., circuits adapted to output a signal at a controllable, programmable or otherwise selectable frequency).

In a non-limiting exemplary scenario, in response to a first frequency control signal, the fractional-N synthesizer 262 may be adapted to generate (or output) a mixing signal characterized by a first intermediate mixing frequency corresponding to a first communication protocol. Continuing, in response to a second frequency control signal, the fractional-N synthesizer 262 may be adapted to generate a mixing signal characterized by a second intermediate mixing frequency corresponding to a second communication protocol. Further, in response to a third frequency control signal, the fractional-N synthesizer 262 may be adapted to generate a mixing signal characterized by an RF frequency corresponding to a third communication protocol (e.g., for direct conversion from RF to baseband).

In another non-limiting exemplary scenario, in response to a first frequency control signal, the fractional-N synthesizer 262 may be adapted to generate (or output) a mixing signal characterized by a first intermediate frequency corresponding to the GSM communication protocol. Such an intermediate frequency may, for example, be approximately 100 KHz or, for example, less than or equal to 150 KHz. Then in response to a second frequency control signal, the fractional-N synthesizer 262 may be adapted to generate (or output) a mixing signal characterized by a second intermediate frequency corresponding to the EDGE communication protocol. Such an intermediate frequency may, for example, be approximately 300 KHz, 200 KHz or, for example, greater than or equal to 150 KHz. Then in response to a third frequency control signal, the fractional-N synthesizer 262 may be adapted to generate (or output) a mixing signal characterized by an RF frequency corresponding to the WCDMA protocol. Such a mixing signal may, for example, be utilized by a mixer (e.g., the mixer 220 or other mixer) for direct conversion of the WCDMA signal from RF to baseband.

The exemplary system 200 may also comprise a variety of amplifier and/or gain circuitry (e.g., an AGC module 230). The AGC module 230 may, for example, be adapted to maintain amplitude of a signal corresponding to any of a variety of communication protocols. Such a signal may, for example, be at an intermediate frequency or a baseband frequency.

The exemplary system 200 may further comprise a filter 240 (e.g., communicatively coupled to the mixer). The filter may, for example and without limitation, share any or all characteristics with the exemplary filter 240 illustrated in FIG. 1 and discussed previously. The filter 240 may, for example, be adapted to filter a signal in accordance with a plurality of selectable sets of filter characteristics. Such sets of filter characteristics may, for example, include bandwidth characteristics, center frequency characteristics, fall-off characteristics, analog/digital filter characteristics, tap number, IIR vs. FIR configuration, etc. As discussed previously, a set of filter characteristics may, for example, correspond to a particular communication mode (or protocol). Also as discussed previously, though the exemplary filter 240 illustrated in FIG. 2 is an analog filter, various aspects of the present invention are readily extensible to digital filters or analog/digital hybrid filters. Additionally, through only one filter with selectable filter characteristics is illustrated in FIG. 2, more than one of such filters may be utilized. As a non-limiting example, a first filter 240 may be as described above, and a second filter (e.g., a digital filter) may be communicatively coupled to the output of the A/D converter 250.

The exemplary system 200 may also include a control module 270 that is adapted to direct the frequency source 260 (e.g., the fractional-N synthesizer 262) to generate the mixing signal at a particular frequency, direct the filter 240 to filter a signal in accordance with a particular set of filter characteristics and/or direct the RF receiver 210 to receive a particular RF signal. The control module 270 may, for example and without limitation, share any or all characteristics with the control module 170 illustrated in FIG. 1.

The exemplary system 200 was presented to provide non-limiting illustrations of a portion of various aspects of the present invention. Accordingly, the scope of various aspects of the present invention should not be limited by particular characteristics of the exemplary system 200.

Figure 3:
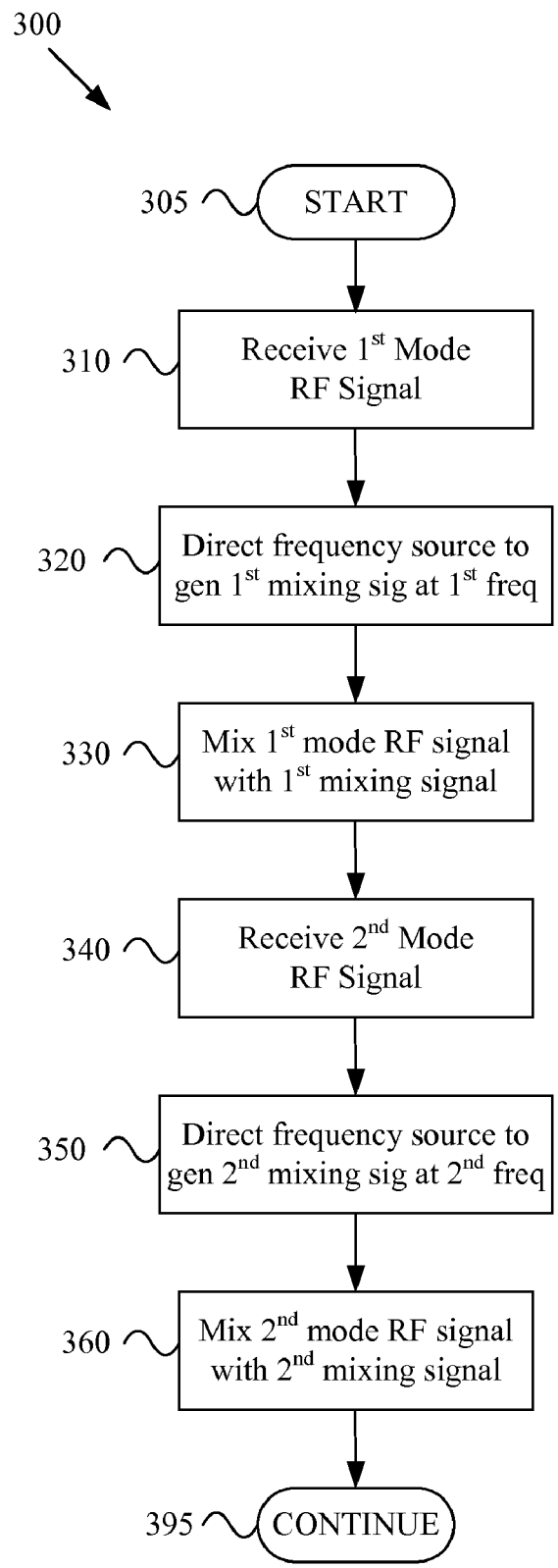
FIG. 3 is a diagram illustrating a method for operating a multimode communication system, in accordance with various aspects of the present invention.

FIG. 3 is a diagram illustrating a method 300 for operating a multimode communication system, in accordance with various aspects of the present invention. The exemplary method 300 may, for example and without limitation, share various functional characteristics with the exemplary systems 100, 200 illustrated in FIGS. 1-2 and discussed previously.

As discussed previously, a multimode communication system implementing the method 300 (or other methods discussed herein) may comprise characteristics of any of a variety of communication systems. For example and without limitation, the multimode communication system may comprise characteristics of mobile communication devices (e.g., cellular phones, paging devices, portable email devices, personal digital assistance, etc.). Also for example, the communication system may comprise characteristics of fixed communication systems or devices (e.g., network access points, base stations, satellites, wireless routers, set top boxes, etc.). Further for example, the communication system may comprise characteristics of a variety of electronic devices with wireless communication capability (e.g., televisions, music players, cameras, remote controls, etc.) Accordingly, the scope of various aspects of the present invention should not be limited by characteristics of particular communication systems or devices.

The exemplary method 300 may begin executing at step 305. The exemplary method 300 may begin executing for any of a variety of reasons. For example, the exemplary method 300 may begin executing upon the arrival of (or detection of) an RF signal. Also for example, the exemplary method 300 may begin in response to waking from a sleep mode or in response to a user or system command. Accordingly, the scope of various aspects of the present invention should not be limited by characteristics if any particular initiating causes or conditions.

The exemplary method 300 may, at step 310, comprise receiving a first RF signal corresponding to a first communication mode (or protocol). Step 310 may, for example and without limitation, share any or all functional characteristics with the RF receivers 110, 210 illustrated in FIGS. 1-2 and discussed previously.

Step 310 may comprise receiving the first RF signal in any of a variety of manners. For example, step 310 may comprise receiving the first RF signal utilizing one or a plurality of RF antennas (e.g., in a MIMO configuration, MISO configuration, beam-forming configuration, etc.). Also, for example, step 310 may comprise receiving the first RF signal utilizing filtering and/or amplifier circuitry adapted to receive/process RF signals corresponding to any of a plurality of communication protocols.

Step 310 may, for example, comprise receiving the first RF signal utilizing an RF signal receiver that is adapted to receive RF signals corresponding to a plurality of respective communication protocols. Such an RF signal receiver may, for example, be adapted to receive a first RF signal corresponding to a first communication protocol and a second RF signal corresponding to a second communication protocol.

The exemplary method 300 may, at step 320, comprise directing a frequency source to generate a first mixing signal characterized by a first frequency corresponding to the first communication protocol. Step 320 may, for example and without limitation, share various functional characteristics with the frequency sources 160, 260 and control modules 170, 270 illustrated in FIGS. 1-2 and discussed previously.

The frequency source may comprise any of a variety of characteristics. For example, the frequency source may be adapted to output a mixing signal characterized by one of a plurality of selectable frequencies (e.g., IF and/or RF frequencies). For example, the frequency source may be adapted to receive a frequency control signal, determine the frequency of a mixing signal based at least in part on the received frequency control signal, and output the mixing signal characterized by the determined frequency. In such an exemplary configuration, step 320 may comprise generating a control signal provided to such a frequency source directing the frequency source to generate a mixing signal characterized by the first frequency.

In a non-limiting exemplary scenario, step 320 may comprise generating a frequency control signal and providing such a control signal to a fractional-N synthesizer to generate the first mixing signal. Alternatively for example, step 320 may comprise directing a local oscillator or other frequency synthesizer to generate the first mixing signal.

Depending on the configuration of the frequency source, step 320 may, for example, comprise directing the frequency source by providing a continuous control signal, an intermittent control signal, a triggering control signal, or by communicating data utilized to program the frequency source.

In a non-limiting exemplary scenario, in response to a first frequency control signal generated at step 320, the frequency source may generate (or output) a mixing signal characterized by a first intermediate mixing frequency corresponding to a first communication protocol.

In another non-limiting exemplary scenario, in response to a first frequency control signal generated at step 320, the frequency source may generate (or output) a mixing signal characterized by a first intermediate frequency corresponding to the GSM communication protocol. Such an intermediate frequency may, for example, be approximately 100 KHz or, for example, less than or equal to 150 KHz. In yet another non-limiting exemplary scenario, in response to a first frequency control signal generated at step 320, the frequency source may generate a mixing signal characterized by a second intermediate frequency corresponding to the EDGE communication protocol. Such an intermediate frequency may, for example, be approximately 300 KHz, 200 KHz or, for example, greater than or equal to 150 KHz. In still another non-limiting exemplary scenario, in response to a first frequency control signal generated at step 320, the frequency source may generate a mixing signal characterized by an RF frequency corresponding to the WCDMA protocol. Such a mixing signal may, for example, be utilized by a mixer (e.g., at step 330) for direct conversion of the WCDMA signal from RF to baseband.

The exemplary method 300 may, at step 330, comprise mixing the first RF signal (e.g., received at step 310) with the first mixing signal (e.g., from the frequency source directed at step 320) at a mixer. Step 330 may, for example and without limitation, share various functional characteristics with the mixers 120, 220 illustrated in FIGS. 1-2 and discussed previously.

For example, step 330 may comprise utilizing a mixer (or similar device) to convert the first received RF signal (e.g., received at step 310) to an IF signal through mixing the first received RF signal with a mixing signal having a particular intermediate mixing frequency (e.g., as directed at step 320). Step 330 may also, for example, comprise utilizing the mixer to convert the first received RF signal to a signal at baseband frequency through mixing the first received RF signal with a mixing signal having the frequency of the received RF signal (e.g., as directed at step 320).

The exemplary method 300 may, at step 340, comprise receiving a second RF signal corresponding to a second communication mode (or protocol). Step 340 may, for example and without limitation, share any or all characteristics with step 310 discussed previously.

For example, step 340 may comprise receiving the second RF signal in any of a variety of manners. For example, step 340 may comprise receiving the second RF signal utilizing one or a plurality of RF antennas (e.g., in a MIMO configuration, MISO configuration, beam-forming configuration, etc.). Such one or more RF antennas may, for example, be the same as antenna(s) utilized at step 310 or may be different. Also, step 340 may comprise receiving the second RF signal utilizing filtering and/or amplifier circuitry adapted to receive/process RF signals corresponding to any of a plurality of communication protocols. Such circuitry may, for example, be the same as that utilized at step 310 or may be different.

Step 340 may comprise receiving the second RF signal utilizing an RF signal receiver that is adapted to receive RF signals corresponding to a plurality of respective communication protocols. Such an RF signal receiver may, for example, be adapted to receive a first RF signal corresponding to a first communication protocol and a second RF signal corresponding to a second communication protocol. Such an RF signal receiver may, for example, be the same as that utilized at step 310 or may be different.

In a non-limiting exemplary scenario where steps 310 and 340 comprise utilizing at least a portion of common circuitry, the utilization of such common circuitry by steps 310 and 340 may be governed by control signals communicated to such common circuitry.

The exemplary method 300 may, at step 350, comprise directing the frequency source (e.g., the same frequency source directed at step 320 or the same type of frequency source) to generate a second mixing signal characterized by a second frequency corresponding to a second communication protocol. Step 350 may, for example and without limitation, share any or all characteristics with step 320 discussed previously.

The frequency source may be the same frequency source as that directed at step 320 or may share any or all characteristics with the frequency source directed at step 320. For example, the frequency source may be adapted to output a mixing signal characterized by one of a plurality of selectable frequencies (e.g., IF and/or RF frequencies). For example, the frequency source may be adapted to receive a frequency control signal, determine the frequency of a mixing signal based at least in part on the received frequency control signal, and output the mixing signal characterized by the determined frequency. In such an exemplary configuration, step 350 may comprise generating a control signal provided to such a frequency source directing the frequency source to generate a mixing signal characterized by the second frequency.

In a non-limiting exemplary scenario, step 350 may comprise generating a frequency control signal and providing such a control signal to a fractional-N synthesizer to generate the second mixing signal. Alternatively for example, step 350 may comprise directing a local oscillator or other frequency synthesizer to generate the second mixing signal.

Depending on the configuration of the frequency source, step 350 may, for example, comprise directing the frequency source by providing a continuous control signal, an intermittent control signal, a triggering control signal, or by communicating data utilized to program the frequency source.

In a non-limiting exemplary scenario, in response to a first frequency control signal generated at step 350, the frequency source may generate (or output) a mixing signal characterized by a second intermediate mixing frequency corresponding to a second communication protocol.

In another non-limiting exemplary scenario, in response to a second frequency control signal generated at step 350, the frequency source may generate (or output) a mixing signal characterized by a second intermediate frequency corresponding to the GSM communication protocol. Such an intermediate frequency may, for example, be approximately 100 KHz or, for example, less than or equal to 150 KHz. In yet another non-limiting exemplary scenario, in response to a second frequency control signal generated at step 350, the frequency source may generate a mixing signal characterized by a second intermediate frequency corresponding to the EDGE communication protocol. Such an intermediate frequency may, for example, be approximately 300 KHz, 200 KHz or, for example, greater than or equal to 150 KHz. In still another non-limiting exemplary scenario, in response to a second frequency control signal generated at step 350, the frequency source may generate a mixing signal characterized by an RF frequency corresponding to the WCDMA protocol. Such a mixing signal may, for example, be utilized by a mixer (e.g., at step 360) for direct conversion of the WCDMA signal from RF to baseband.

The exemplary method 300 may, at step 360, comprise mixing the second RF signal and the second mixing signal at the mixer (e.g., the same mixer utilized at step 330). Step 360 may, for example and without limitation, share any or all characteristics with step 330 discussed previously.

For example, step 360 may comprise utilizing the mixer to convert the second received RF signal (e.g., received at step 340) to an IF signal through mixing the second received RF signal with a mixing signal having a particular intermediate mixing frequency (e.g., as directed at step 350). Step 360 may also, for example, comprise utilizing the mixer to convert the second received RF signal to a signal at baseband frequency through mixing the second received RF signal with a mixing signal having the frequency of the received RF signal (e.g., as directed at step 350).

The exemplary method 300 may, at step 395, perform any of a large variety of continued processing. For example and without limitation, step 395 may comprise processing various signals utilizing automatic gain control. Step 395 may also, for example, comprise converting signals between the analog and digital domains. Further for example, step 395 may comprise performing additional filtering of various signals.

In a non-limiting exemplary scenario, the first and second RF signals may be received and processed in a time-multiplexed manner. In such a scenario, steps 310-330 might be executed during reception of RF signals corresponding to a first communication protocol, and steps 340-360 might be executed during reception of RF signals corresponding to a second communication protocol. In such a scenario, step 395 may comprise directing execution flow of the exemplary method 300 according to the type of RF signal that is presently being received.

Figure 4:
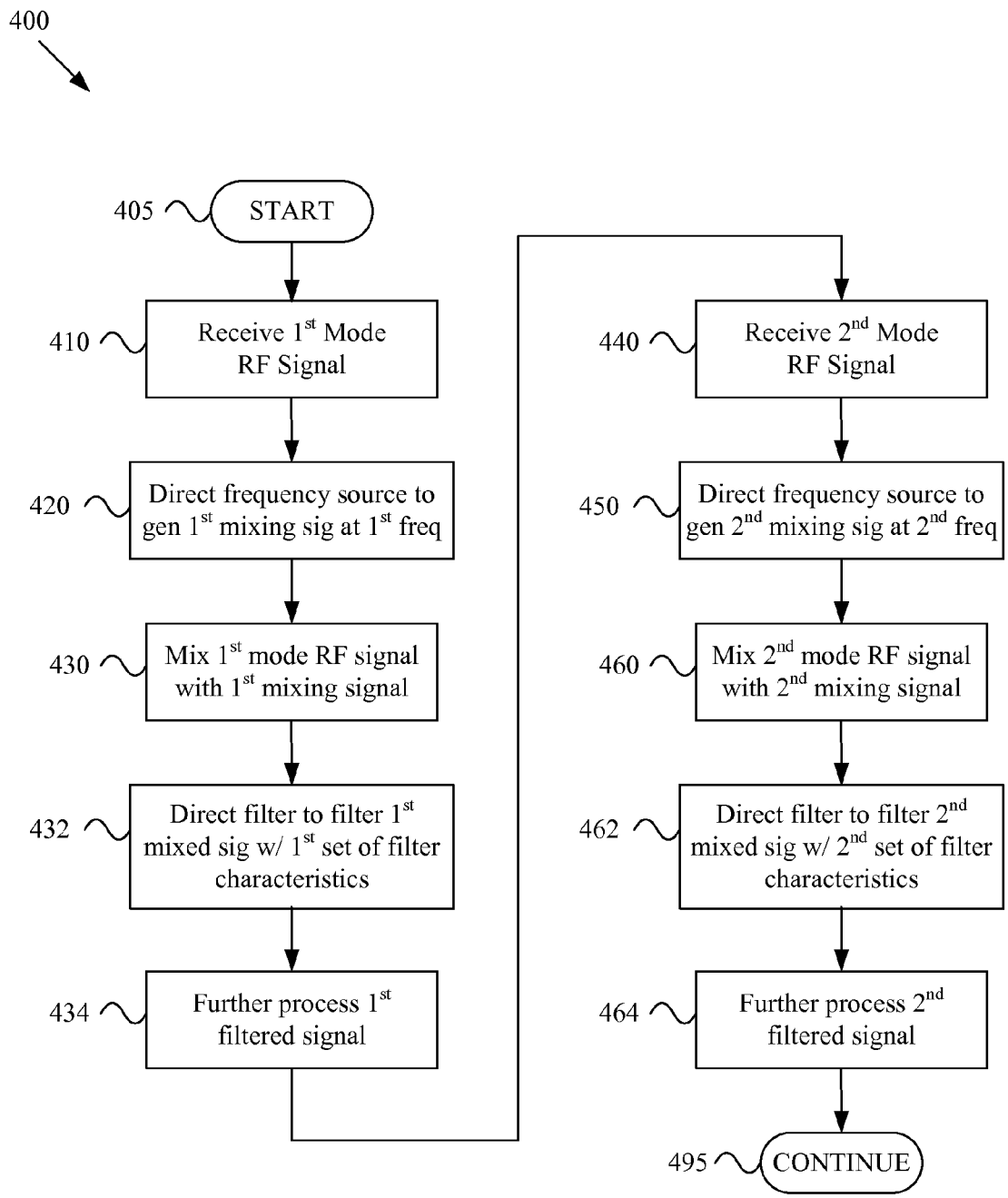
FIG. 4 is a diagram illustrating a method for operating a multimode communication system, in accordance with various aspects of the present invention.

FIG. 4 is a diagram illustrating a method 400 for operating a multimode communication system, in accordance with various aspects of the present invention. The exemplary method 400 may, for example and without limitation, share any or all characteristics with the method 300 illustrated in FIG. 3 and discussed previously.

The exemplary method 400 may, at steps 410-430, comprise receiving a first RF signal corresponding to a first communication protocol (or mode), directing a frequency source to generate a first mixing signal characterized by a first frequency corresponding to the first communication protocol, and mixing the first RF signal and the first mixing signal at a mixer (or similar module). Steps 410-430 may, for example and without limitation, share any or all characteristics with steps 310-330 of the exemplary method 300 illustrated in FIG. 3 and discussed previously.

The exemplary method 400 may, at step 432, comprise filtering a mixed signal in accordance with a selected one of a plurality of selectable sets of filter characteristics. Step 432 may, for example, comprise directing a filter (e.g., a controllable filter) to filter the mixed signal in accordance with the selected set of filter characteristics. Step 432 may, for example and without limitation, share any or all functional characteristics with the control modules 170, 270 and filters 140, 240 illustrated in FIGS. 1-2 and discussed previously.

Various exemplary characteristics of controllable filters and selectable sets of filter characteristics were presented previously. For example, step 432 may comprise performing various filtering or filter control operations, such as, for example, those presented in U.S. patent application Ser. No. 11/298,371, entitled "MULTIMODE COMMUNICATION DEVICE WITH SHARED SIGNAL PATH PROGRAMMABLE FILTER," which is hereby incorporated herein in its entirety by reference.

Also for example, a set of filter characteristics may correspond to a particular communication protocol (or mode). For example and without limitation, a first set of filter characteristics may correspond to a first communication protocol and comprise a first filter bandwidth and/or first filter center frequency. A second set of filter characteristics may then, for example, correspond to a second communication protocol and comprise a second filter bandwidth and/or second filter center frequency. An $N^{th}$ set of filter characteristics may, for example, correspond to an $N^{th}$ communication protocol and comprise an $N^{th}$ filter bandwidth and/or $N^{th}$ filter center frequency.

In a non-limiting exemplary scenario, a first set of filter characteristics may correspond to the GSM protocol and comprise a relatively narrow filter bandwidth, and a second set of filter characteristics may correspond to the WCDMA protocol and comprise a relatively wide filter bandwidth.

Note that step 432 may comprise directing and/or performing analog and/or digital filtering. Also note that step 432 may comprise directing one or more of a plurality of filters to perform desired filtering functionality. Such analog/digital filtering may accordingly be combined with any desired conversion between the analog and digital domains.

In a non-limiting exemplary scenario, a communication system implementing the exemplary method 400 (or module of such a system) may determine to receive a signal corresponding to a first communication protocol. Step 410 may then comprise receiving the first RF signal corresponding to the first communication protocol, step 420 may comprise directing the frequency source to generate a first mixing signal characterized by a frequency corresponding to the first communication protocol, step 430 may comprise mixing the received first RF signal and the first mixing signal to produce a first mixed signal, and step 432 may comprise directing a filter to filter the first mixed signal (or signal representative thereof) in accordance with a selected first set of filter characteristics corresponding to the first communication protocol.

The exemplary method 400 may, at step 434, comprise performing various types of additional processing with a communication signal (e.g., as received at step 420, mixed at steps 420-430 and filtered at step 432). For example and without limitation, such further processing may comprise performing various amplification (e.g., AGC control), analog/digital conversion, filtering, digital signal processing, and other operations.

The exemplary method 400 may, at steps 440-460, comprise receiving a second RF signal corresponding to a second communication mode, directing a frequency source to generate a second mixing signal characterized by a second frequency corresponding to the second communication protocol, and mixing the second RF signal and the second mixing signal at a mixer (or similar module). Steps 440-460 may, for example and without limitation, share any or all characteristics with steps 340-360 of the exemplary method 300 illustrated in FIG. 3 and discussed previously.

The exemplary method 400 may, at step 462, comprise filtering a mixed signal in accordance with a selected one of a plurality of selectable sets of filter characteristics. Step 462 may, for example, comprise directing a filter (e.g., a controllable filter) to filter the mixed signal in accordance with the selected set of filter characteristics. Step 462 may, for example and without limitation, share any or all functional characteristics with step 432 discussed previously. Various non-limiting exemplary aspects of filters and sets of filter characteristics were discussed previously.

In a non-limiting exemplary scenario, after receiving and processing a communication signal corresponding to a first communication protocol at steps 410-434, a communication system implementing the exemplary method 400 (or module of such a system) may determine to receive and process a signal corresponding to a second communication protocol. Step 440 may then, for example, comprise receiving the second RF signal corresponding to the second communication protocol, step 450 may comprise directing the frequency source to generate a second mixing signal characterized by a frequency corresponding to the second communication protocol, step 460 may comprise mixing the received second RF signal and the second mixing signal to produce a second mixed signal, and step 462 may comprise directing a filter to filter the second mixed signal (or signal representative thereof) in accordance with a selected second set of filter characteristics corresponding to the second communication protocol.

The exemplary method 400 may, at step 464, comprise performing various types of additional processing with a communication signal (e.g., as received at step 440, mixed at steps 450-460 and filtered at step 462). For example and without limitation, such further processing may comprise performing various amplification (e.g., AGC control), analog/digital conversion, filtering, digital signal processing, and other operations.

The exemplary method 400 may, at step 495, comprise performing any of a large variety of continued processing, various examples of which were provided previously in the discussion of step 395 of FIG. 3.

In a non-limiting exemplary scenario, the first and second RF signals may be received and processed in a time-multiplexed manner. In such a scenario, steps 410-434 might be executed during reception of RF signals corresponding to a first communication protocol, and steps 440-464 might be executed during reception of RF signals corresponding to a second communication protocol. In such a scenario, step 495 may comprise directing execution flow of the exemplary method 400 according to the type of RF signal that is presently being received.

The exemplary methods 300, 400 were presented to provide non-limiting illustrations of a portion of various aspects of the present invention. Accordingly, the scope of various aspects of the present invention should not be limited by particular characteristics of the exemplary methods 300, 400.

For illustrative clarity, the exemplary systems 100-200 were presented in terms of various functional modules. Various modules may, for example, be implemented in hardware, software or a combination thereof. Various module may, for example, be implemented in a single integrated circuit or combination of integrated circuits. Also, various modules may share various sub-modules and/or subcomponents. For example and without limitation, various hardware modules may share various electrical components, and various software modules may share various software subroutines. Accordingly, the scope of various aspects of the present invention should not be limited by characteristics of any particular hardware and/or software implementation or by any arbitrary boundaries between various functional modules.

In summary, various aspects of the present invention provide a system and method providing variable-frequency IF conversion in a multimode communication device. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A multimode communication device comprising:
    at least one RF signal receiver operable to receive a first RF signal during at least one time window corresponding to a first communication protocol and a second RF signal during at least one time window corresponding to a second communication protocol;
    a frequency source operable to:
        receive at least one frequency control signal; and
        in response to the at least one frequency control signal, output a mixing signal at one of a plurality of selectable frequencies, where the plurality of selectable frequencies comprises:
            a first mixing frequency corresponding to the first communication protocol, where the first mixing frequency is an RF frequency utilized for direct conversion of the first RF signal to a baseband frequency and is output during the at least one time window corresponding to the first communication protocol; and
            a second mixing frequency corresponding to the second communication protocol, where the second mixing frequency is an IF frequency utilized for conversion of the second RF signal to an intermediate frequency and is output during the at least one time window corresponding to the second communication protocol;
    a mixer, communicatively coupled to the at least one RF signal receiver and the frequency source; and
    at least one module, communicatively coupled to the frequency source, operable to direct the frequency source to output the mixing signal at a selected one of the plurality of selectable frequencies.

2. The multimode communication device of claim 1, wherein the at least one RF signal receiver, the at least one signal source, the mixer, and the at least one module are all in a single integrated circuit.

3. The multimode communication device of claim 1, where the first communication protocol is a direct sequence spread spectrum-based (DSSS) communication protocol, and the second communication protocol is a non-DSSS-based communication protocol.

4. The multimode communication device of claim 1, wherein the frequency source comprises a fractional-N synthesizer.

5. The multimode communication device of claim 1, wherein the frequency source is programmable.

6. The multimode communication device of claim 1, further comprising a filter, communicatively coupled to the mixer, adapted to filter a signal in accordance with a selected one of a plurality of selectable sets of filter characteristics.

7. The multimode communication device of claim 6, where the plurality of selectable sets of filter characteristics comprises:
   a first set of filter characteristics corresponding to the first communication protocol and comprising a first bandwidth; and
   a second set of filter characteristics corresponding to the second communication protocol and comprising a second bandwidth.

8. The multimode communication device of claim 6, where the plurality of selectable sets of filter characteristics comprises:
   a first set of filter characteristics corresponding to the first communication protocol and comprising a first center frequency; and
   a second set of filter characteristics corresponding to the second communication protocol and comprising a second center frequency.

9. The multimode communication device of claim 6, where the filter is programmable.

10. The multimode communication device of claim 6, wherein the at least module is communicatively coupled to the filter and adapted to direct the filter to filter at a selected one of the plurality of selectable sets of filter characteristics.

11. In a multimode communication device, a method for receiving a plurality of RF signals corresponding to a plurality of respective communication protocols, the method comprising:
   receiving a first RF signal during at least one time window corresponding to a first communication protocol;
   directing a frequency source to generate, during the at least one time window corresponding to the first communication protocol, a first mixing signal characterized by a first frequency corresponding to the first communication protocol, where the first mixing frequency is an RF frequency utilized for direct conversion of the first RF signal to a baseband frequency;
   mixing the first RF signal and the first mixing signal at a mixer;
   receiving a second RF signal during at least one time window corresponding to a second communication protocol;
   directing the frequency source to generate, during the at least one time window corresponding to the second communication protocol, a second mixing signal characterized by a second frequency corresponding to the second communication protocol, where the second mixing frequency is an IF frequency utilized for conversion of the second RF signal to an intermediate frequency; and
   mixing the second RF signal and the second mixing signal at the mixer.

12. The method of claim 11, wherein said receiving steps, said directing steps, and said mixing steps are performed in a single integrated circuit.

13. The method of claim 11, wherein the first communication protocol is a direct sequence spread spectrum-based (DSSS) communication protocol, and the second communication protocol is a non-DSSS-based communication protocol.

14. The method of claim 11, comprising generating the first and second mixing signals with a fractional-N synthesizer.

15. The method of claim 11, wherein:
   said directing a frequency source to generate a first mixing signal comprises programming the frequency source to generate the first mixing signal; and
   said directing the frequency source to generate a second mixing signal comprises programming the frequency source to generate the second mixing signal.

16. The method of claim 11, comprising filtering a mixed signal in accordance with a selected one of a plurality of selectable sets of filter characteristics.

17. The method of claim 16, wherein the plurality of selectable sets of filter characteristics comprises:
   a first set of filter characteristics corresponding to the first communication protocol and comprising a first bandwidth; and
   a second set of filter characteristics corresponding to the second communication protocol and comprising a second bandwidth.

18. The method of claim 16, wherein the plurality of selectable sets of filter characteristics comprises:
   a first set of filter characteristics corresponding to the first communication protocol and comprising a first center frequency; and
   a second set of filter characteristics corresponding to the second communication protocol and comprising a second center frequency.

19. The method of claim 16, wherein said filtering a mixed signal comprises programming a filter to filter the mixed signal.

20. The method of claim 16, wherein said filtering a mixed signal comprises directing a filter to filter the mixed signal at a selected one of the plurality of selectable sets of filter characteristics.

* * * * *